(12) United States Patent
Kawashiri et al.

(10) Patent No.: US 7,913,799 B2
(45) Date of Patent: Mar. 29, 2011

(54) WORKING VEHICLE

(75) Inventors: Shinya Kawashiri, Osaka (JP);
Norikazu Nakayama, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 428 days.

(21) Appl. No.: 11/989,804

(22) PCT Filed: Sep. 16, 2005

(86) PCT No.: PCT/JP2005/017151
§ 371 (c)(1),
(2), (4) Date: Mar. 10, 2008

(87) PCT Pub. No.: WO2007/029344
PCT Pub. Date: Mar. 15, 2007

(65) Prior Publication Data
US 2010/0101887 A1    Apr. 29, 2010

(30) Foreign Application Priority Data

Sep. 7, 2005    (JP) .................................. 2005-259584

(51) Int. Cl.
*B60K 20/04* (2006.01)
*B60K 20/08* (2006.01)
*B60K 26/04* (2006.01)
*F02D 11/02* (2006.01)
*F02D 11/04* (2006.01)

(52) U.S. Cl. ....... 180/335; 180/336; 74/482; 74/473.15; 74/473.17

(58) Field of Classification Search .................. 180/335, 180/336, 321, 322, 323; 192/3.53, 220.3; 74/473.15, 473.16, 473.17, 482
See application file for complete search history.

(56) References Cited

U.S. PATENT DOCUMENTS

| 3,040,596 | A | * | 6/1962 | Du Shane et al. | 74/482 |
| 4,341,129 | A | * | 7/1982 | Bando | 74/481 |
| 5,211,070 | A | * | 5/1993 | Hirata et al. | 74/473.21 |
| 6,250,414 | B1 | * | 6/2001 | Sato et al. | 180/307 |
| 2006/0081084 | A1 | * | 4/2006 | Nishino et al. | 74/473.1 |

FOREIGN PATENT DOCUMENTS

| JP | 59-216729 | | 12/1984 |
| JP | 02014930 A | * | 1/1990 |
| JP | 2-193722 | | 7/1990 |
| JP | 3-057731 | | 3/1991 |
| JP | 2004-199447 | | 7/2004 |
| JP | 2005-119466 | | 5/2005 |

* cited by examiner

*Primary Examiner* — Paul N Dickson
*Assistant Examiner* — Keith Frisby
(74) *Attorney, Agent, or Firm* — Jordan and Hamburg LLP

(57) ABSTRACT

The invention provides a working vehicle which can easily couple the accelerator arm of the governor of the engine and the shift peal in spite that the rotating speed of the engine can be easily changed on the basis of the operation of the shift pedal, and the manufacturing cost can be easily reduced. In a working vehicle provide with an engine mounted to a traveling machine body provided with traveling wheels, a hydraulic continuously variable transmission shifting a power from the engine, and a shift pedal operating so as to increase and decrease a shift output of the hydraulic continuously variable transmission and an accelerator arm of the engine are coupled via an interlocking mechanism.

8 Claims, 9 Drawing Sheets

WORKING VEHICLE

TECHNICAL FIELD

The present invention relates to a working vehicle such as a tractor used in a farm work, a wheel loader used in a civil engineering work or the like, in which the working vehicle is configured such as to operate so as to increase and decrease a shift output of a hydraulic continuously variable transmission by a shift pedal and move forward or backward.

BACKGROUND ART

Conventionally, in general, in the working vehicle such as the tractor, the wheel loader mentioned above, at a time of transmitting a power to right and left rear wheels coupled to a rear portion of the working vehicle, the structure is made such that the power is transmitted to the right and left rear wheels via a transmission mechanism of a transmission case to which the power is transmitted from an engine mounted to a front portion of a traveling machine body in the working vehicle.

In this case, in the conventional working vehicle, the structure is made such that the transmission case is arranged in a rear portion of the traveling machine body, the hydraulic continuously variable transmission is provided in a front portion of the transmission case, and an operator operates the shift pedal so as to change a change gear ratio of the continuously variable transmission and change a moving speed of the working vehicle (for example, refer to patent document 1).
Patent Document 1: Japanese Unexamined Patent Publication No. Sho59-216729

DISCLOSURE OF THE INVENTION

Problem to be Solved by the Invention

In the prior art mentioned above, since the shift pedal is couple in the middle of the connection between an accelerator operating lever operated by the operator and an accelerator arm of a governor of the engine via a cam body or the like, and a rotating speed of the engine is changed on the basis of the operation of the shift pedal, a complicated mechanism such as the cam body or the like is necessary for coupling the shift pedal to the governor. For example, in the case that the cam body or the like is arranged in a low position of the machine body in which the shift pedal is arranged, there are problems such that a dirt soil is attached to the cam body or the like, whereby the cam body or the like comes to a malfunction, an arranging structure of the cam body or the like is limited by the coupling mechanism between the accelerator operating lever and the accelerator arm, whereby a manufacturing cost can not be easily lowered, and the like.

An object of the present invention is to provide a working vehicle which can easily couple the accelerator arm of the governor of the engine and the shift pedal in spite that the rotating speed of the engine can be easily changed on the basis of the operation of the shift pedal, and the manufacturing cost can be easily reduced.

Means for Solving the Problem

In order to achieve the object mentioned above, in accordance with a first aspect of the present invention, there is provided a power transmission in a working vehicle comprising: an engine mounted to a traveling machine body provided with traveling wheels; a hydraulic continuously variable transmission shifting a power from the engine; and a shift pedal operating so as to increase and decrease a shift output of the hydraulic continuously variable transmission, wherein a speed returning mechanism of the hydraulic continuously variable transmission and an accelerator arm of the engine are coupled via an interlocking mechanism.

In accordance with a second aspect of the present invention, there is provided a power transmission in a working vehicle as recited in the first aspect, wherein the speed returning mechanism has a shift link coupling the hydraulic continuously variable transmission and the shift pedal, and a speed returning link elastically pressurized to the shift link by a speed returning spring force, a foot of an operator comes away from the shift pedal and the shift pedal is returned to an original position, whereby the shift link is returned to an original position by the speed returning link so as to maintain an output of the hydraulic continuously variable transmission approximately zero.

In accordance with a third aspect of the present invention, there is provided a power transmission in a working vehicle as recited in the second aspect, wherein the accelerator arm is arranged in a speed adjusting mechanism capable of adjusting a rotating speed of the engine, and the hydraulic continuously variable transmission is operated to a speed increasing side on the basis of a pedaling operation of the shift pedal, whereby the speed adjusting mechanism is activated via the speed returning mechanism approximately in proportion to an amount of a pedaling operation of the shift pedal.

In accordance with a fourth aspect of the present invention, there is provided a power transmission in a working vehicle as recited in the first aspect, wherein a drive control portion is provided with an accelerator operating lever capable of being maintained at a position operated by an operator, and the operator operates the accelerator operating lever so as to operate the accelerator arm.

In accordance with a fifth aspect of the present invention, there is provided a power transmission in a working vehicle as recited in the first aspect, wherein the speed returning mechanism has an accelerator coupling arm in which a length is adjustable, and the accelerator coupling arm and the accelerator arm are coupled via a coupling wire of the interlocking mechanism.

In accordance with a sixth aspect of the present invention, there is provided a power transmission in a working vehicle as recited in the first aspect, wherein the interlocking mechanism has a coupling wire constituted by an inner wire and an outer wire, the inner wire is locked to the accelerator coupling arm via a stopper, and the accelerator coupling arm at the original position is configured such as to be capable of coming into contact with and coming away from an outer receiver for locking the outer wire.

In accordance with a seventh aspect of the present invention, there is provided a power transmission in a working vehicle as recited in the first aspect, wherein the interlocking mechanism has a coupling wire constituted by an inner wire and an outer wire, the inner wire is locked to the accelerator coupling arm via a stopper, and an outer receiver for locking the outer wire is configured such as to be capable of coming into contact with and coming away from the accelerator coupling arm at the original position.

In accordance with an eighth aspect, of the present invention, there is provided a power transmission in a working vehicle as recited in any one of the first to seventh aspects, wherein the speed returning mechanism has a speed returning spring and a speed returning link for maintaining an output of the hydraulic continuously variable transmission approximately zero, the speed returning link is rotatable in the same direction on the basis of each of operations in a forward moving side and a backward moving side of the shift pedal, and the speed returning link is coupled to a speed adjusting mechanism capable of adjusting a rotating speed of the engine via the interlocking mechanism.

In accordance with a ninth aspect of the present invention, there is provided a power transmission in a working vehicle as recited in the first aspect, wherein the power transmission is provided with a setting mechanism for changing an interlocking range in which the speed returning mechanism and the accelerator arm are coupled via the interlocking mechanism, and an operating means for changing the interlocking range set by the setting mechanism.

In accordance with a tenth aspect of the present invention, there is provided a power transmission in a working vehicle as recited in the ninth aspect, wherein the setting mechanism is configured such as to be capable of reducing the interlocking range to a high speed output side on the basis of an output at a time when the shift pedal is at the original position, and the accelerator arm is operated via the speed returning mechanism on the basis of a pedaling operation in a high speed output side of the shift pedal.

In accordance with an eleventh aspect of the present invention, there is provided a power transmission in a working vehicle as recited in the first aspect, wherein the continuously variable transmission and the shift pedal are coupled via a shift link, a speed returning link serving as the speed returning mechanism is coupled to the shift link, one end side of a coupling wire serving as the interlocking mechanism is coupled to the speed returning link, and the other end side of the coupling wire is coupled to the accelerator arm.

In accordance with a twelfth aspect of the present invention, there is provided a power transmission in a working vehicle as recited in the first aspect, wherein the shift pedal is constituted by a forward moving pedal and a backward moving pedal, a base end side of the forward moving pedal and a base end side of the backward moving pedal are respectively coupled to both end portions of one pedal shaft, and the pedal shaft is rotatably arranged in a step of the traveling machine body.

In accordance with a thirteenth aspect of the present invention, there is provided a power transmission in a working vehicle as recited in the twelfth aspect, wherein the forward moving pedal and a brake pedal for braking a rear wheel of the traveling machine body are arranged so as to be adjacent right and left in a plan view.

In accordance with a fourteenth aspect of the present invention, there is provided a power transmission in a working vehicle as recited in the thirteenth aspect, wherein a pedaling portion of the forward moving pedal is arranged in a front side in a forward moving direction in comparison with the pedal shaft, a pedaling portion of the backward moving pedal is arranged in a rear side in the forward moving direction in comparison with the pedal shaft, and the pedaling portion of the forward moving pedal and the pedaling portion of the backward moving pedal are arranged so as to be spaced in a diagonal direction in a plan view.

Effect of the Invention

In accordance with the first aspect of the present invention, in the working vehicle provided with the engine mounted to the traveling machine body provided with the traveling wheels, the hydraulic continuously variable transmission shifting the power from the engine, and the shift pedal operating so as to increase and decrease the shift output of the hydraulic continuously variable transmission, the speed returning mechanism of the hydraulic continuously variable transmission and the accelerator arm of the engine are coupled via the interlocking mechanism. Accordingly, it is possible to easily configure the interlocking mechanism for changing the rotating speed of the engine on the basis of the operation of the shift pedal. It is possible to easily reduce a manufacturing cost of the structure in which the interlocking mechanism or the like is arranged. Further, the operator can easily operate the shift pedal in the same feeling as an accelerator pedal of a general motor vehicle. Since the rotating speed of the engine is lowered only by releasing the foot of the operator from the shift pedal, it is possible to shorten a braking distance on the basis of an engine brake effect. In the case of moving at a low speed, the engine is activated at a low speed, and it is possible to reduce a noise and a fuel consumption.

In accordance with the second aspect of the present invention, the structure is made such that the speed returning mechanism has the shift link coupling the hydraulic continuously variable transmission and the shift pedal, and the speed returning link elastically pressurized to the shift link by the speed returning spring force, the foot of the operator comes away from the shift pedal and the shift pedal is returned to the original position, whereby the shift link is returned to the original position by the speed returning link so as to maintain the output of the hydraulic continuously variable transmission approximately zero. Accordingly, the speed returning mechanism can be easily configured by the shift link and the speed returning link, and it is possible to easily reduce a manufacturing cost of the structure in which the speed returning mechanism or the like is arranged.

In accordance with the third aspect of the present invention, the structure is made such that the accelerator arm is arranged in the speed adjusting mechanism capable of adjusting the rotating speed of the engine, and the hydraulic continuously variable transmission is operated to the speed increasing side on the basis of the pedaling operation of the shift pedal, whereby the speed adjusting mechanism is activated via the speed returning mechanism approximately in proportion to the amount of the pedaling operation of the shift pedal. Accordingly, it is possible to easily couple the speed adjusting mechanism and the speed returning mechanism, and the operator can easily operate the shift pedal in the same feeling as the accelerator pedal of the general motor vehicle.

In accordance with the fourth aspect of the present invention, the structure is made such that the drive control portion is provided with the accelerator operating lever capable of being maintained at the position operated by the operator, and the operator operates the accelerator operating lever so as to operate the accelerator arm. Accordingly, it is possible to change the rotating speed of the engine while giving priority to the operation in the side in which the rotating speed of the engine becomes high, in any one of the operation of the accelerator operating lever and the operation of the shift pedal. Further, it is possible to change the rotating speed of the engine on the basis of the operation of the shift pedal, while maintaining a minimum rotating speed of the engine on the basis of the operation of the accelerator operating lever.

In accordance with the fifth aspect of the present invention, the speed returning mechanism has the accelerator coupling arm in which the length is adjustable, and the accelerator coupling arm and the accelerator arm are coupled via the coupling wire of the interlocking mechanism. Accordingly, it is possible to optionally set a range (an idling rotating speed or a maximum rotating speed) of the rotating speed of the engine changed by the operation of the shift pedal, with respect to an operating stroke of the shift pedal.

In accordance with the sixth aspect of the present invention, the structure is made such that the interlocking mechanism has the coupling wire constituted by the inner wire and the outer wire, the inner wire is locked to the accelerator coupling arm via the stopper, and the accelerator coupling arm at the original position is configured such as to be capable of coming into contact with and coming away from the outer receiver for locking the outer wire. Accordingly, it is possible to optionally set the range (the idling rotating speed or the maximum rotating speed) of the rotating speed of the engine changed by the operation of the shift pedal, with respect to the operating stroke of the shift pedal.

In accordance with the seventh aspect of the present invention, the structure is made such that the interlocking mechanism has the coupling wire constituted by the inner wire and the outer wire, the inner wire is locked to the accelerator coupling arm via the stopper, and the outer receiver for locking the outer wire is configured such as to be capable of coming into contact with and coming away from the accelerator coupling arm at the original position. Accordingly, it is possible to optionally set the range (the idling rotating speed or the maximum rotating speed) of the rotating speed of the engine changed by the operation of the shift pedal, with respect to the operating stroke of the shift pedal.

In accordance with the eighth aspect of the present invention, the speed returning mechanism has the speed returning spring and the speed returning link for maintaining the output of the hydraulic continuously variable transmission approximately zero, the speed returning link is rotatable in the same direction on the basis of each of the operations in the forward moving side and the backward moving side of the shift pedal, and the speed returning link is coupled to the speed adjusting mechanism capable of adjusting the rotating speed of the engine via the interlocking mechanism. Accordingly, for example, even in a see-saw pedal structure in which each of the operations in the forward moving side and the backward moving side can be carried out by one shift pedal, it is possible to easily couple the shift pedal to the accelerator arm of the engine via one wire or link, and it is possible to easily reduce the manufacturing cost.

In accordance with the ninth aspect of the present invention, the working vehicle is provided with the setting mechanism for changing the interlocking range in which the speed returning mechanism and the accelerator arm are coupled via the interlocking mechanism, and the operating means for changing the interlocking range set by the setting mechanism. Accordingly, it is possible to optionally set the range (the idling rotating speed or the maximum rotating speed) of the rotating speed of the engine changed by the operation of the shift pedal, with respect to the operating stroke of the shift pedal, for example, only by the operation of the operating means by an operator in a control seat, and it is possible to easily adapt the interlocking range to a working condition or the like.

In accordance with the tenth aspect of the present invention, the structure is made such that the setting mechanism is configured such as to be capable of reducing the interlocking range to the high speed output side on the basis of the output at a time when the shift pedal is at the original position, and the accelerator arm is operated via the speed returning mechanism on the basis of the pedaling operation in the high speed output side of the shift pedal. Accordingly, it is possible to execute a high load work while setting the minimum rotating speed of the engine to the high speed side and maintaining the moving speed to the low speed, and it is possible to easily prevent a trouble (a stop due to an overload or the like) of the engine in the high load work.

In accordance with the eleventh aspect of the present invention, the continuously variable transmission and the shift pedal are coupled via the shift link, the speed returning link serving as the speed returning mechanism is coupled to the shift link, one end side of the coupling wire serving as the interlocking mechanism is coupled to the speed returning link, and the other end side of the coupling wire is coupled to the accelerator arm. Accordingly, it is possible to configure the speed returning mechanism and the interlocking mechanism by a simple structure such as a link, a wire or the like, and it is possible to improve a workability for an assembly, a maintenance or the like.

In accordance with the twelfth aspect of the present invention, the shift pedal is constituted by the forward moving pedal and the backward moving pedal, the base end side of the forward moving pedal and the base end side of the backward moving pedal are respectively coupled to both end portions of one pedal shaft, and the pedal shaft is rotatably arranged in the step of the traveling machine body. Accordingly, it is possible to dispense with a feint mechanism or the like for inhibiting an operation of the other in the case of operating any one of the forward movement or the backward movement, and it is possible to easily form the structure of the shift pedal.

Further, it is possible to easily assemble the shift pedal by utilizing the step. For example, it is possible to detachably install the shift pedal without attaching and detaching the step, in comparison with the conventional structure in which the shift pedal is arranged in the traveling machine body side.

In accordance with the thirteenth aspect of the present invention, the forward moving pedal and the brake pedal for braking the rear wheel of the traveling machine body are arranged so as to be adjacent right and left in the plan view. Accordingly, it is possible to easily improve an operability of the forward moving pedal and the brake pedal which are used very often in the forward moving work.

In accordance with the fourteenth aspect of the present invention, the pedaling portion of the forward moving pedal is arranged in the front side in the forward moving direction in comparison with the pedal shaft, the pedaling portion of the backward moving pedal is arranged in the rear side in the forward moving direction in comparison with the pedal shaft, and the pedaling portion of the forward moving pedal and the pedaling portion of the backward moving pedal are arranged so as to be spaced in the diagonal direction in a plan view. Accordingly, it is possible to arrange the pedaling portion of the forward moving pedal and the pedaling portion of the backward moving pedal in such a manner as to be spaced greatly so as to prevent an erroneous operation, by effectively utilizing a top surface of the step having a limited area.

Figure 1:
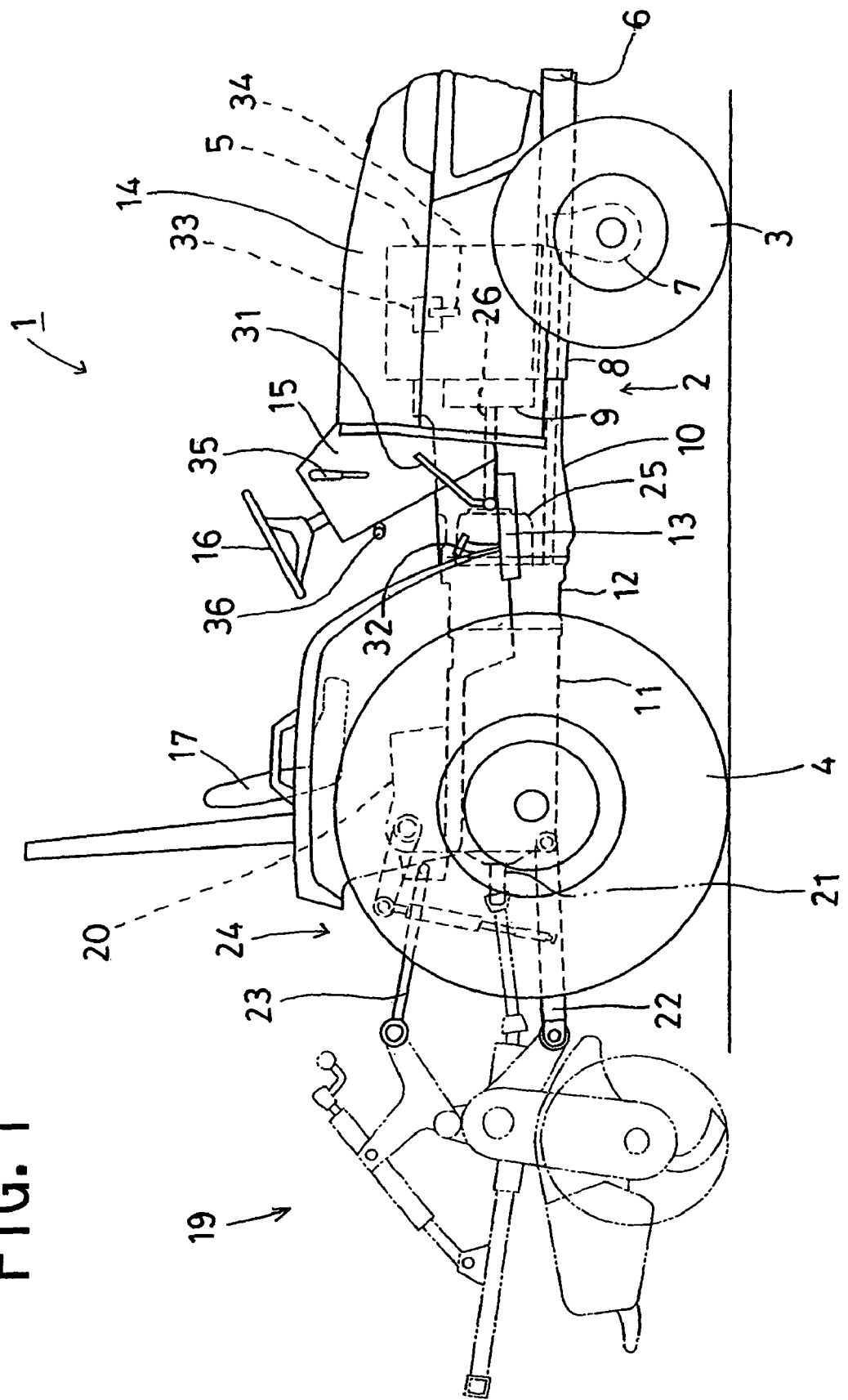
FIG. 1 is a side elevational view of a whole of a tractor.

DESCRIPTION OF REFERENCE NUMERALS 2 traveling machine body
3 front wheel
4 rear wheel 5 engine
15 control column (drive control portion)
18 floor plate (step)
25 continuously variable transmission
30 brake pedal
31 forward moving pedal (shift pedal)
31a pedaling portion of forward moving pedal
32 backward moving pedal (shift pedal)
32b pedaling portion of backward moving pedal
34 accelerator arm
35 accelerator operating lever
37 pedal shaft
41 shift link (speed returning mechanism)
57 speed returning link (speed returning mechanism)
59 speed returning spring (speed returning mechanism)
71 coupling wire (interlocking mechanism)
72 inner wire
73 outer wire
75 outer wire receiver
77 accelerator coupling arm (speed returning mechanism)
78 wire stopper
88 operation dial (control means)
89, 93 screw (setting mechanism)

BEST MODE FOR CARRYING OUT THE INVENTION

Figure 2:
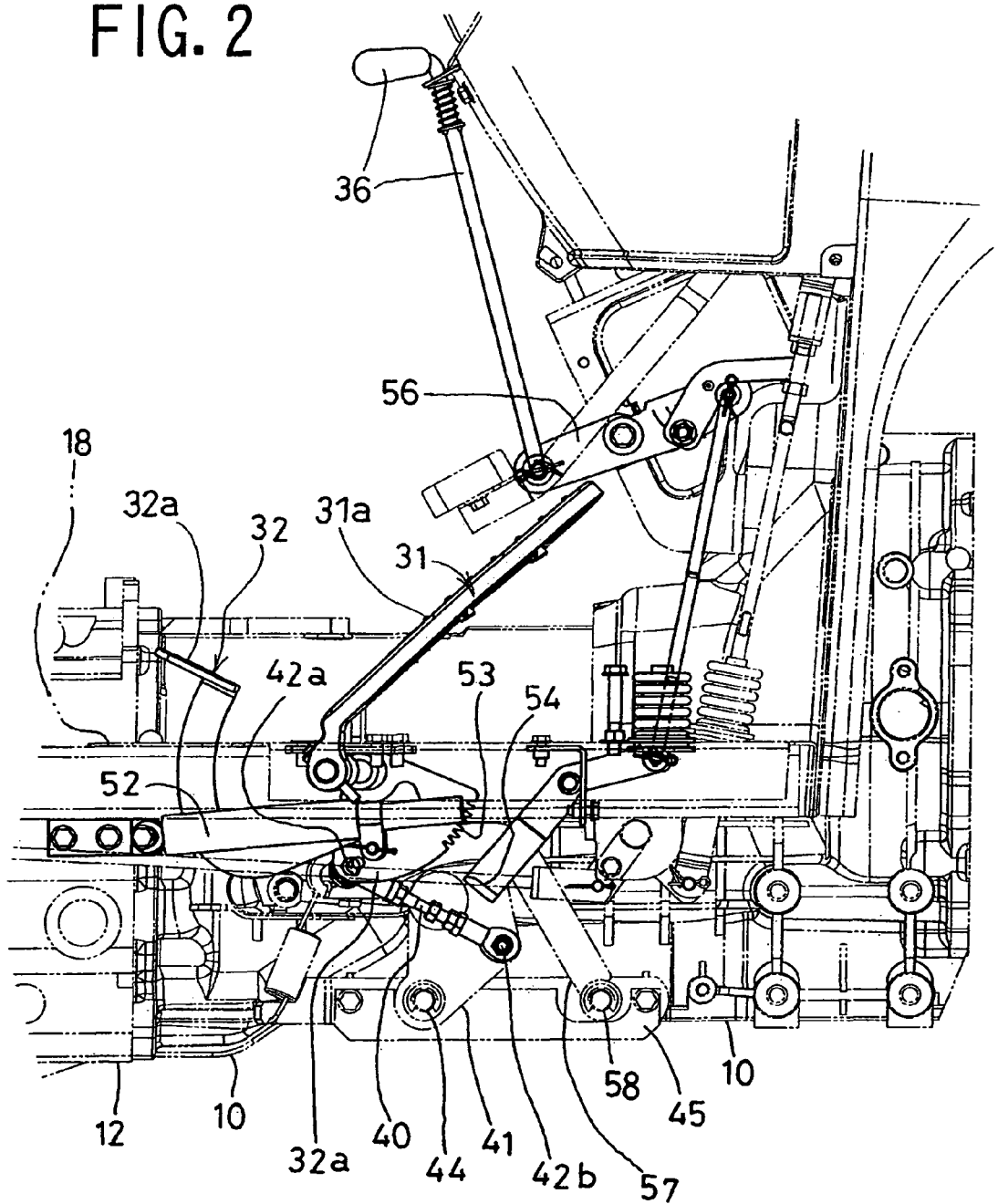
FIG. 2 is a side elevational view of a shift pedal portion.
Figure 3:
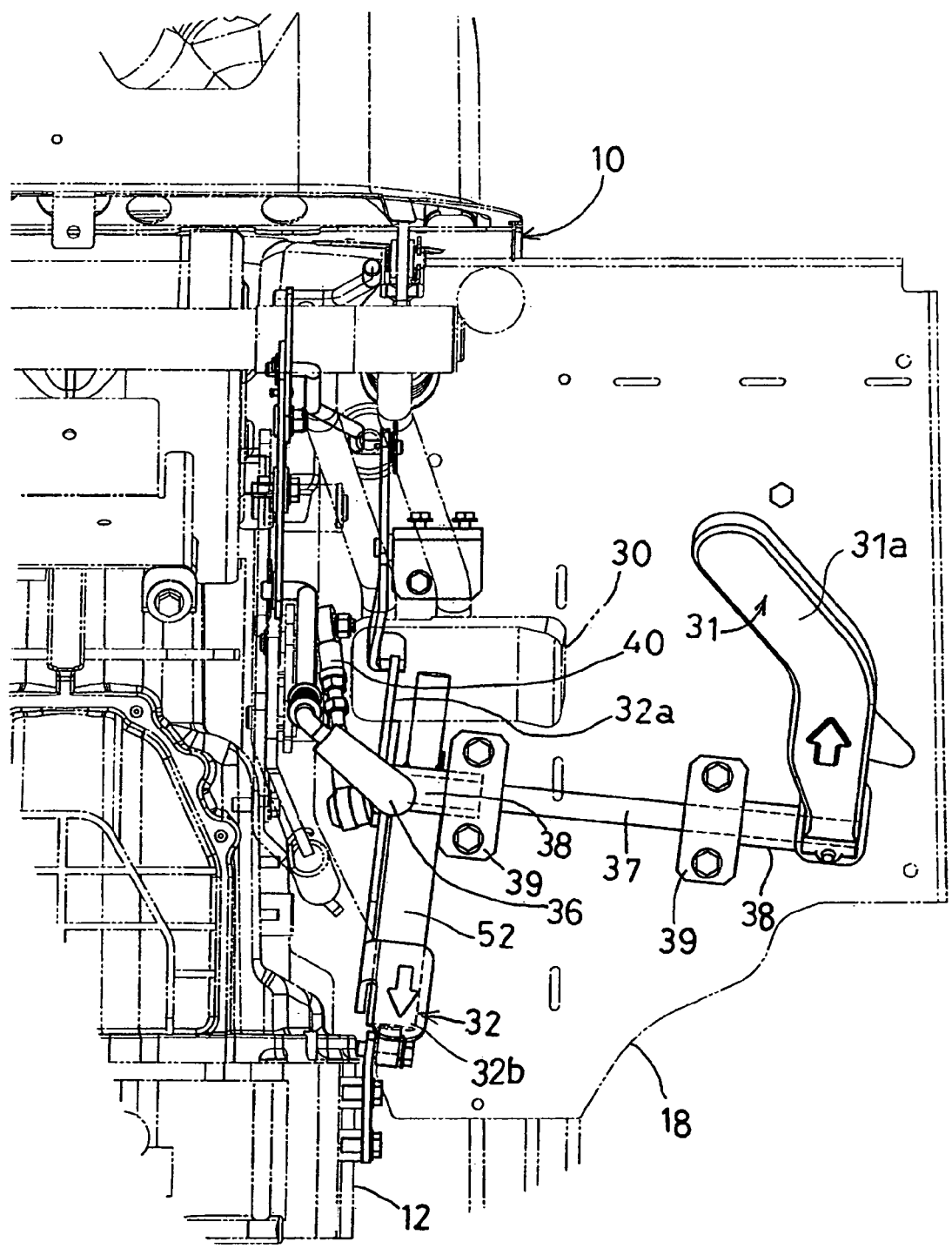
FIG. 3 is a plan view of the shift pedal portion.
Figure 4:
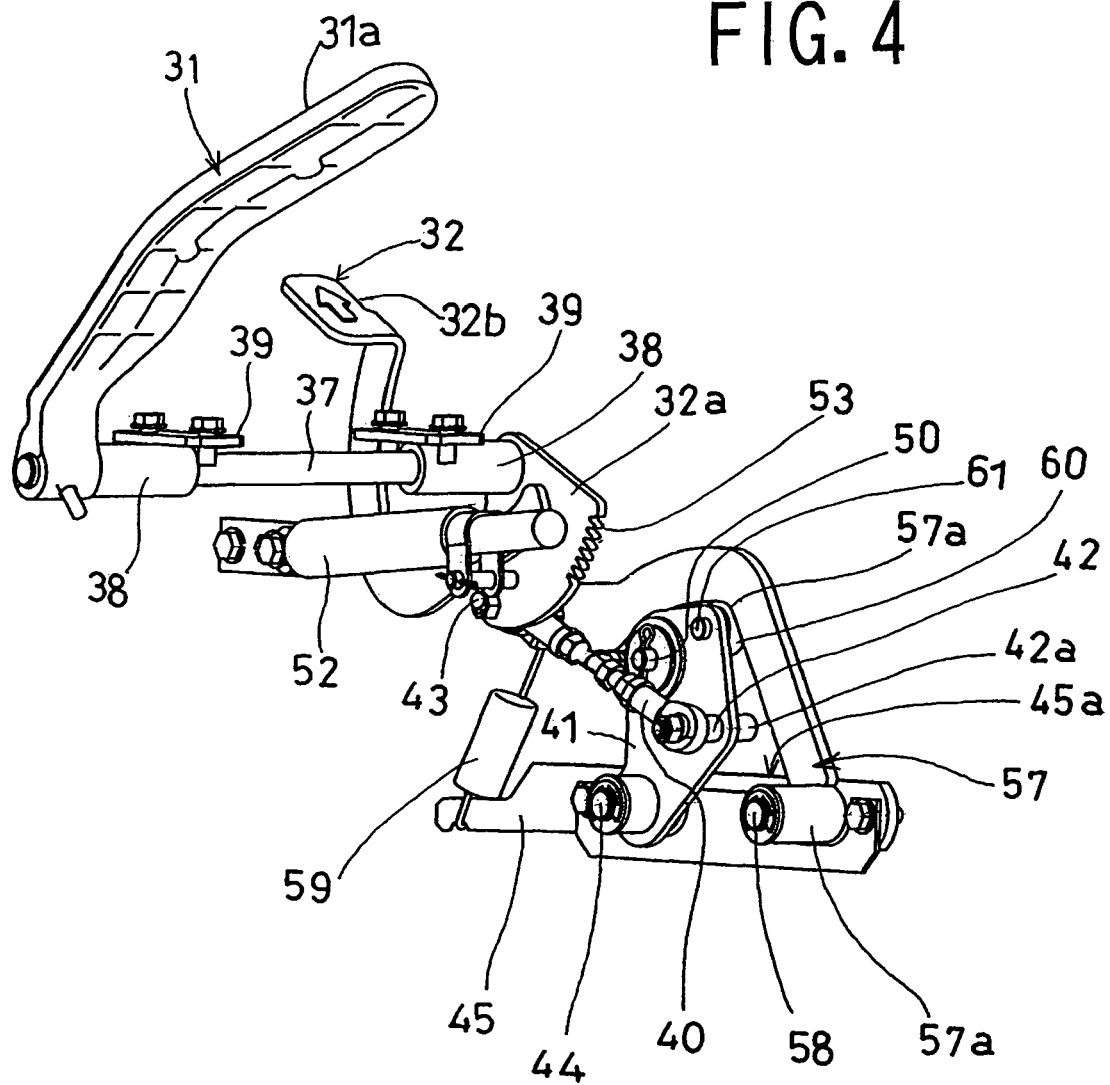
FIG. 4 is a perspective view of the shift pedal portion.
Figure 5:
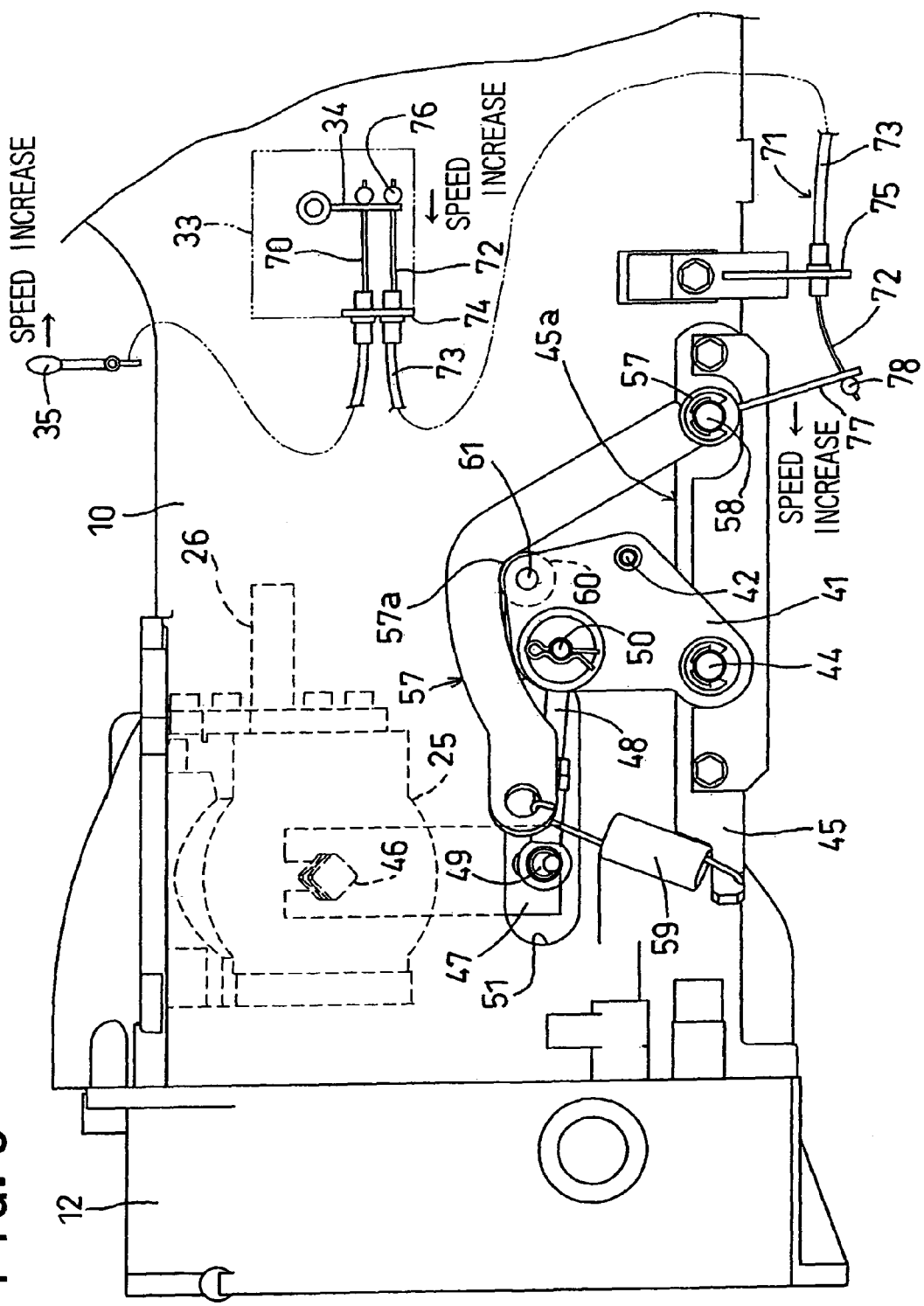
FIG. 5 is a partly enlarged side elevational view of the shift pedal portion.
Figure 6:
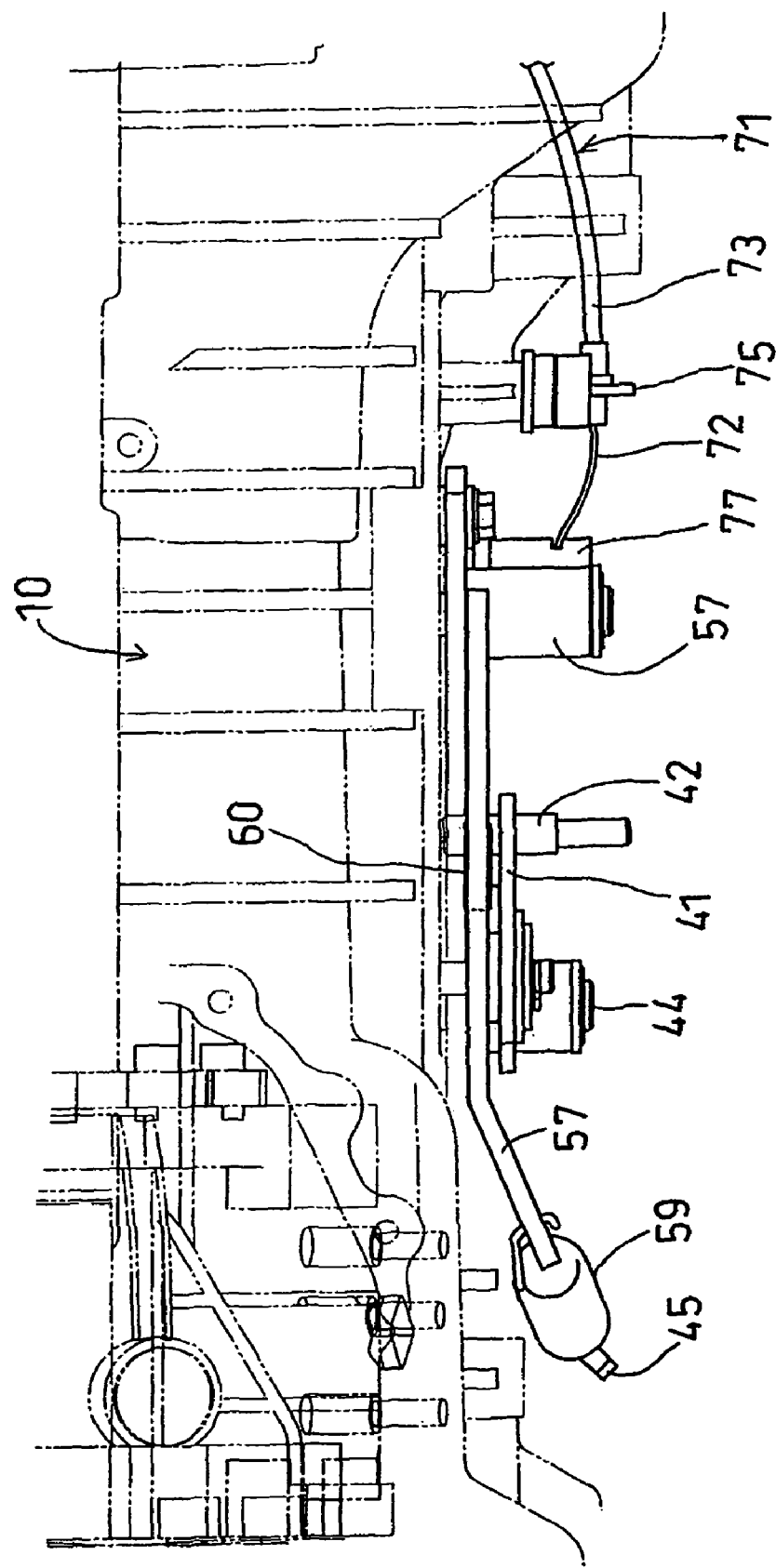
FIG. 6 is a partly enlarged plan view of the shift pedal portion.
Figure 7:
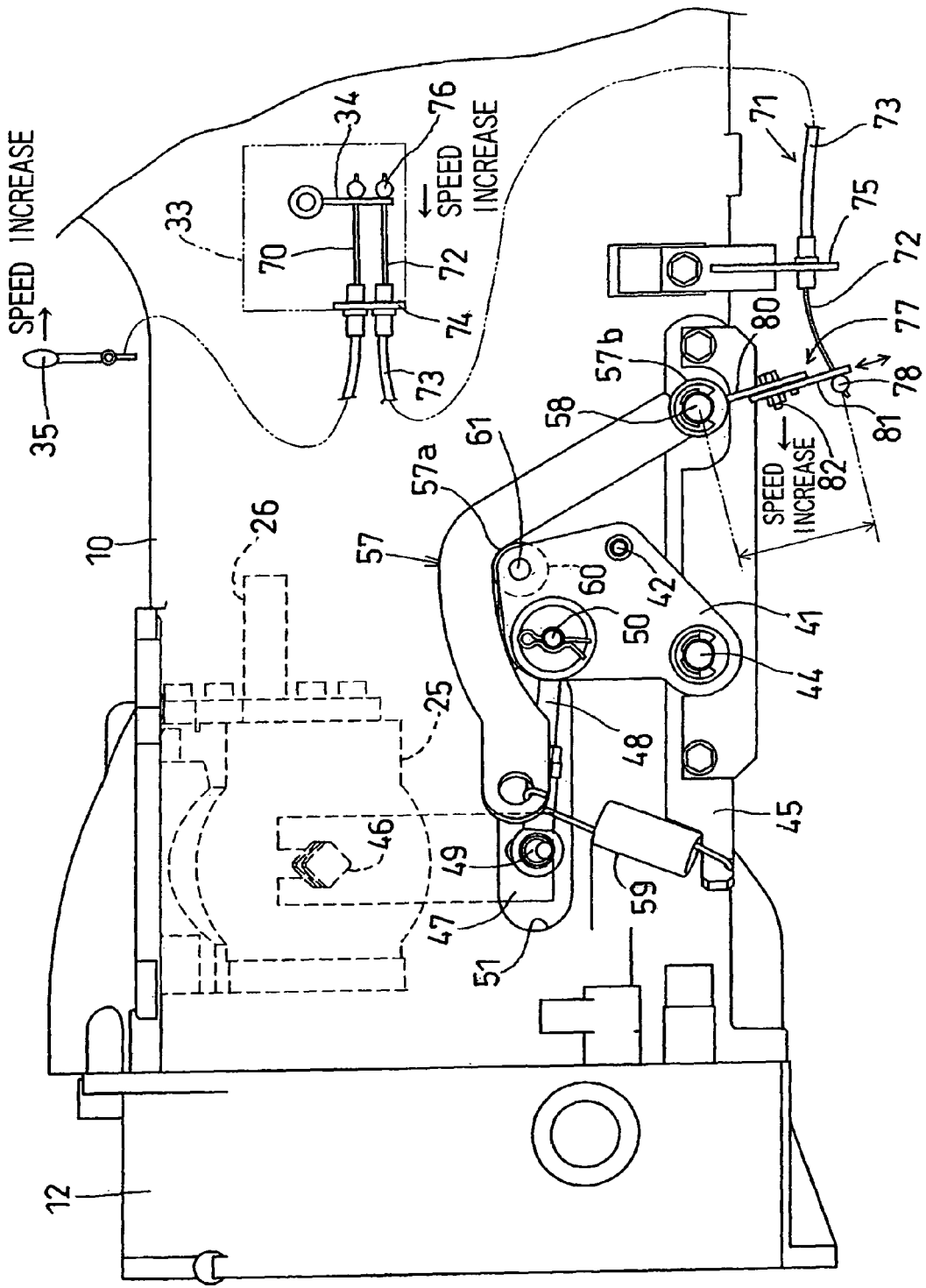
FIG. 7 is a partly enlarged side elevational view of a shift pedal portion showing a second embodiment.
Figure 8:
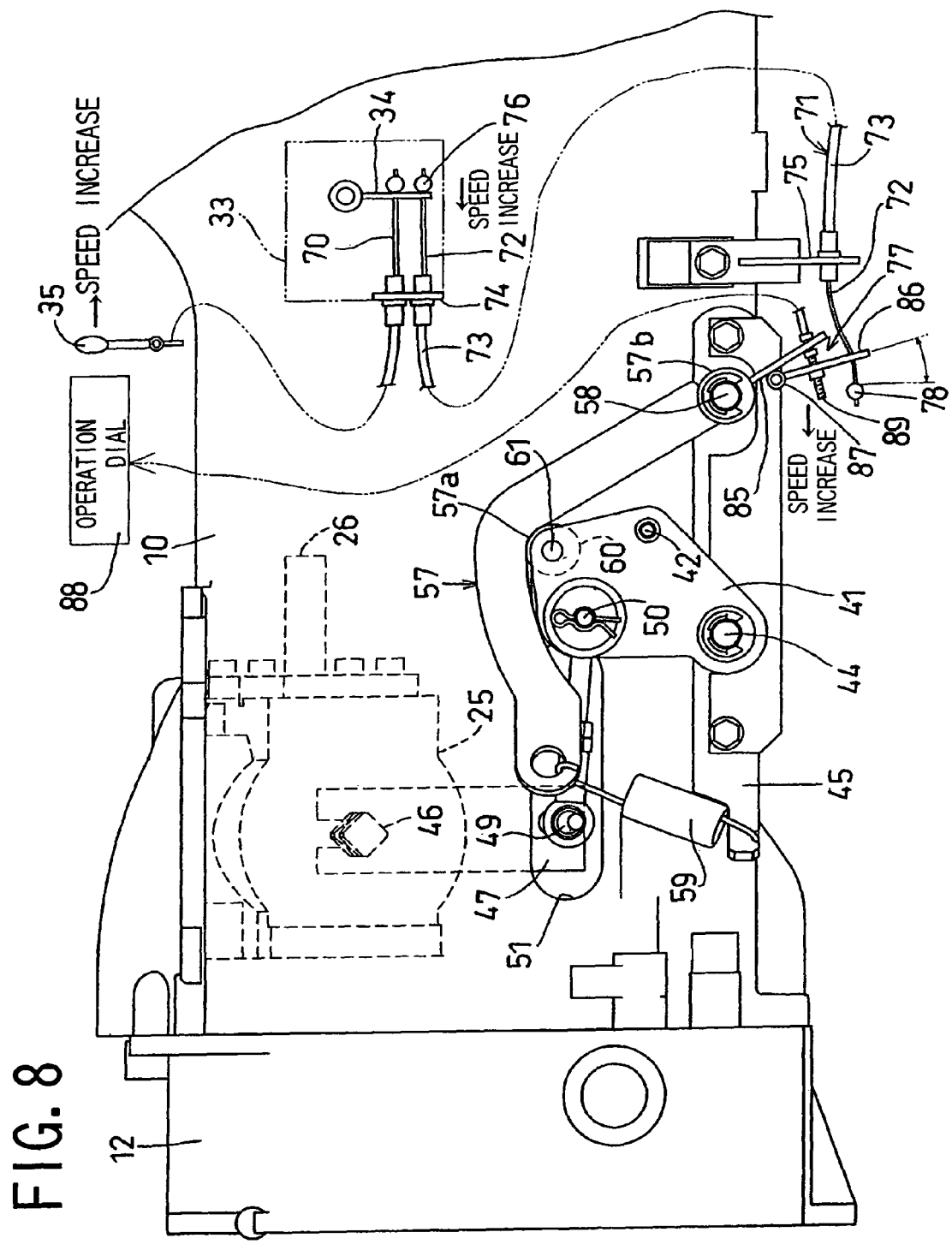
FIG. 8 is a partly enlarged side elevational view of a shift pedal portion showing a third embodiment.
Figure 9:
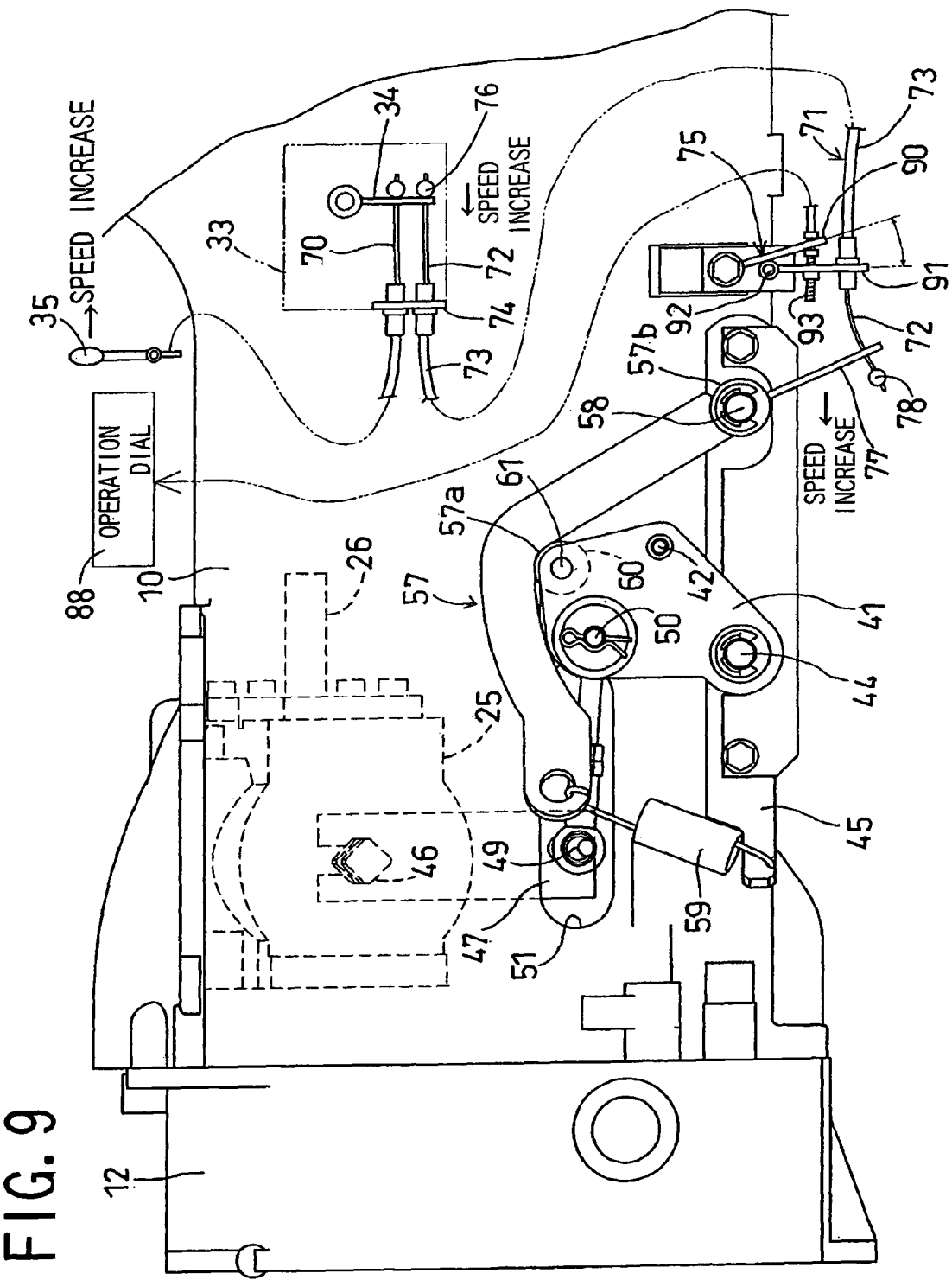
FIG. 9 is a partly enlarged side elevational view of a shift pedal portion showing a fourth embodiment.

A description will be given of an embodiment in accordance with the present invention with reference to the accompanying drawings showing a case that the present invention is applied to a tractor for a farm work serving as a working vehicle. FIG. 1 is a side elevational view of a tractor, FIG. 2 is a side elevational view of a shift pedal portion, FIG. 3 is a plan view of the shift pedal portion, FIG. 4 is a perspective view of the shift pedal portion, FIG. 5 is a partly enlarged side elevational view of the shift pedal portion, FIG. 6 is a partly enlarged plan view of the shift pedal portion, FIG. 7 is a partly enlarged side elevational view of a shift pedal portion showing a second embodiment, FIG. 8 is a partly enlarged side elevational view of a shift pedal portion showing a third embodiment, and FIG. 9 is a partly enlarged side elevational view of a shift pedal portion showing a fourth embodiment.

As shown in FIG. 1, a tractor 1 is configured such as to travel forward and backward by supporting a traveling machine body 2 by a pair of right and left front wheels 3 and a pair of right and left rear wheels 4 and driving both the rear wheels 4 and both the front wheels 3 by an engine 5 mounted to a front portion of the traveling machine body 2. The traveling machine body 2 is constituted by an engine frame 8 having a front bumper 6 and a front axle case 7, a clutch housing 10 having a main clutch 9 for connecting and disconnecting a power output from the engine 5, a transmission case 11 for appropriately changing rotation of the engine 5 so as to transmit to both the rear wheels 4 and both the front wheels 3, a transmission front surface case 12 for coupling the transmission case 11 to the clutch housing 10, and a pair of right and left step frames 13 detachably installed so as to outward protrude from an outer side surface of the clutch housing 10. A rear end side of the engine frame 8 is coupled to right and left outer side surfaces of the engine 5. A front surface side of the clutch housing 10 is coupled to a rear surface side of the engine 5. A front surface side of the transmission case 11 is coupled to a rear surface side of the clutch housing 10 via the transmission front surface case 12.

The engine 5 is covered by a hood 14. Further, a control column 15 is provided in a rising manner on an upper surface of the clutch housing 10. A steering wheel 16 configured such as to steer by moving both the front wheels 3 right and left is arranged in an upper surface side of the control column 15. A control seat 17 is arranged on an upper surface of the transmission case 11. Further, both the front wheels 3 are attached to the engine frame 8 via the front axle case 7. Both the rear wheels 4 are attached to the transmission case 8 via a rear axle case (not shown) detachably installed so as to protrude outward from an outer side surface of the transmission case 8.

On an upper surface of the transmission case 11, there is detachably attached a hydraulic working machine elevating mechanism 20 for moving up and down a working machine 19 such as a power tiller or the like coupled to a rear portion of the traveling machine body 2. Further, a PTO shaft 21 for transmitting a driving force to the working machine 19 is provided in a rear side surface of the transmission case 11 in such a manner as to protrude rearward. The working machine 19 is coupled to a rear portion of the transmission case 11 via a three-point link mechanism 24 comprising a pair of right and left lower links 22 and a top link 23.

A hydraulic continuously variable transmission (HST) 25 mentioned below is arranged in a front side surface of the transmission front surface case 12. The hydraulic continuously variable transmission 25 is inside provided in a rear portion of the clutch housing 10. The rotation of the engine 5 is transmitted to the continuously variable transmission 25 via a main driving shaft 26 protruding rearward from the main clutch 9, is next shifted appropriately by an auxiliary shift gear mechanism (not shown) of the transmission case 11, and is transmitted to both the rear wheels 4 and both the front wheels 3. Further, the rotation of the engine 5 from the main driving shaft 26 is appropriately shifted by a PTO shift gear mechanism (not shown) of the transmission case 11 so as to be transmitted to the PTO shaft 21.

Next, a description will be given of a structure of a control portion operated by an operator of the control seat 8 with reference to FIGS. 1 to 5. A flat floor plate 18 is provided in an upper surface of the step frame 13. The control column 15 is protruded from the floor plate 18 in a front side of the control seat 8, and on an upper surface of the floor plate 18 in a right side of the control column 15, there are arranged a brake pedal 30 actuating a brake mechanism for braking the right and left rear wheels, and a forward moving pedal 31 and a backward moving pedal 32 actuating a trunnion arm 47 for shifting the continuously variable transmission 25. Further, an accelerator control lever 35 coupled to an accelerator arm 34 of a governor 33 of the engine 5 is arranged in a right side surface (a right side in the direction of the forward moving direction) of the control column 15. Further, a cruise lever 36 maintaining the forward moving pedal 31 and the backward moving pedal 32 at an operating position is arranged on a rear surface (a side surface in the control seat 8 side) of the control column 15.

As shown in FIGS. 3 and 4, a base end portion of the forward moving pedal 31 is coupled to one end side (a right side end) of a pedal shaft 37. A pedal arm 32a of the backward moving pedal 32 is coupled to the other end side (a left side end) of the pedal shaft 37. Right and left bearing bodies 38 are rotatably fitted to the pedal shaft 37. The right and left bearing bodies 38 are detachably fixed to an upper surface of the floor plate 18 via a stop plate 39 or the like.

Further, a shift link 41 is coupled to the pedal arm 32a via a first shift rod 40 having an adjustable length and shaft bodies 42a and 42b. The shift link 41 is rotatably arranged in an arm attaching frame 45 of the clutch housing 10 via a shift link supporting point shaft 44. On the other hand, a trunnion arm 47 for shifting the continuously variable transmission 25 is arranged in a trunnion shaft 46 of the continuously variable transmission 25 within the clutch housing 10. The shift link 41 is coupled to the trunnion arm 47 via a second shift rod 48 and shaft bodies 49 and 50. In this case, the shaft body 49 for coupling the trunnion arm 47 and the second shift rod 48 is passed through a long hole 51 formed in the clutch housing 10.

Accordingly, in the case that the operator pedals the forward moving pedal 31 and the backward moving pedal 32 for actuation to a speed increasing side, the pedal arm 32a is rotated, the shift link 41 is rotated via the first shift rod 40, the trunnion arm 47 is rotated via the second shift rod 48, an angle of a swash plate of a hydraulic pump (not shown) of the continuously variable transmission 25 is changed, an output rotating speed of the continuously variable transmission 25 is increased, and a moving speed for the forward movement or the backward movement of the tractor 1 is optionally increased.

In the case of pedaling the backward moving pedal 32 to the maximum, the stopper 42a in one end side of the shaft body 42 for coupling the first shift rod 40 and the shift link 41 is brought into contact with an end surface 45a in an upper surface side of the arm attaching frame 45, and a pedaling amount of the backward moving pedal 32 is regulated. Further, a gas damper 52 arranged in the traveling machine body 2 is coupled to the pedal arm 32a, and operating loads of the forward moving pedal 31 and the backward moving pedal 32 are set by the gas damper 52.

Next, a rack gear 53 is formed in the pedal arm 32a. A cruise arm 54 for detachably locking to the rack gear 53 is arranged in a side surface of the clutch housing 10. A cruise lever 36 is coupled to the cruise arm 54 via a cruise rod or a cruise link 56 and the like. The operator pulls up the cruise lever 36, whereby the cruise arm 54 is locked to the rack gear 53, and the forward moving pedal 31 and the backward moving pedal 32 are maintained at a pedaled position. In the case that the cruise arm 54 is locked to the rack gear 53, the cruise arm 54 is detached from the rack gear 53 at a time when the operator pedals the forward moving pedal 31 and the backward moving pedal 32, or at a time when the operator pulls down the cruise lever 36.

An outer side of the clutch housing 10 is provided with a speed returning link 57 and a speed returning spring 59 serving as a speed returning mechanism for returning the forward moving pedal 31 and the backward moving pedal 32 to their original positions, and maintaining the shift output of the continuously variable transmission 25 appropriately zero. One end side (a base end side) of the speed returning link 57 is pivoted to the arm attaching frame 45 via a link shaft 58. The other end side (a free end side) of the speed returning link 57 is coupled to the arm attaching frame 45 via the speed returning spring 59. A rotating roller 60 of the shift link 41 is brought into contact with a concave portion 57a in an intermediate portion of the speed returning link 57 in which a lower surface side is formed approximately as an L-shaped form. In other words, the speed returning link 57 is elastically pressed to the rotating roller 60 by a force of the speed returning spring 59. In the case that the operator pedals the forward moving pedal 31 (or the backward moving pedal 32), the shift link 41 is rotated on the basis of a pedaling force of the forward moving pedal 31 (or the backward moving pedal 32), the trunnion arm 47 is rotated to the other positions than the neutral position, and the shift output of the continuously variable transmission 25 is increased to a forward moving side (or a backward moving side). In this case, the rotating roller 60 gets out of the concave portion 57a on the basis of a forward rotation (or a backward rotation) of the shift link 41, and rotates the speed returning link 57 against the speed returning spring 59. In this case, in either pedaling operation of the forward moving pedal 31 and the backward moving pedal 32, the speed returning link 57 is rotated in the same direction against the speed returning spring 59. Further, the rotating roller 60 is pivoted to the shift link 41 via a roller shaft 61.

Accordingly, in the case that the foot of the operator gets off from the forward moving pedal 31 and the backward moving pedal 32, the shift link 41 is rotated by the force of the speed returning spring 59 in such a manner that the rotating roller 60 is returned to the concave portion 57a in a center portion of a lower surface of the speed returning link 57. Accordingly, the forward moving pedal 31 and the backward moving pedal 32 are returned to the original positions, the trunnion arm 47 is rotated to the neutral position, the angle of the swash plate of the hydraulic pump (not shown) of the continuously variable transmission 25 becomes approximately zero, and the output rotating speed of the continuously variable transmission 25 is maintained approximately zero.

Next, a description will be given of a first embodiment in accordance with the present invention with reference to FIGS. 5 and 6. The accelerator operating lever 35 is coupled to the accelerator arm 34 of the governor 33 mentioned above via an accelerator wire 70 which can be activated only in a pulling direction. The operator actuates the accelerator arm 34 by operating the accelerator operating lever 35 so as to change a fuel injection amount of the governor 33 and optionally set the rotating speed of the diesel type engine 5 between idling rotating speed and a maximum rotating speed. In this case, even if the operator releases the hand from the accelerator operating lever 35 at an optional operating position, the accelerator operating lever 35 is maintained at an optional operating position by a brake mechanism (not shown).

Further, a coupling wire 71 is provided as an interlocking mechanism for coupling the speed returning link 57 serving as the speed returning mechanism and the accelerator arm 34. The coupling wire 71 is constituted by an inner wire 72 and an outer wire 73, and both end portions of the outer wire 73 are coupled to outer receiving bodies 74 and 75. On the other hand, one end side of the inner wire 72 is coupled to the accelerator arm 34 via a wire stopper 76 so as to be activated only in the pulling direction. On the other hand, an accelerator coupling arm 77 is arranged in a boss portion 57a of the speed returning link 57 fitted to the link shaft 58. The other end side of the inner wire 72 is coupled to the accelerator coupling arm 77 via a wire stopper 78 so as to be activated only in the pulling direction.

Accordingly, in the case that the operator pedals the forward moving pedal 31 and the backward moving pedal 32 so as to optionally change the moving speed in the forward movement or the backward movement of the tractor 1, the speed returning link 57 is rotated against the speed returning spring 59 in proportion to the pedaling amount of the forward moving pedal 31 and the backward moving pedal 32, and the inner wire 72 is pulled via the accelerator coupling arm 77 so as to rotate the accelerator arm 34 in the speed increasing side, thereby increasing the rotating speed of the engine 5. In this case, the rotating speed of the engine 5 is increased working with the forward moving pedal 31 and the backward moving pedal 32 at a rotating speed equal to or higher than the rotating speed set by the accelerator operating lever 35.

As is apparent from the description mentioned above and FIG. 5, in the working vehicle provided with the engine 5 mounted to the traveling machine body 2 having the front wheels 3 and the rear wheels 4 as the traveling wheels, the hydraulic continuously variable transmission 25 shifting the power from the engine 5, and the forward moving pedal 31 and the backward moving pedal 32 serving as the shift pedals operating so as to increase and decrease the shift output of the hydraulic continuously variable transmission 25, the structure is made such as to couple the speed returning link 57 serving as the speed returning mechanism of the hydraulic continuously variable transmission 25 and the accelerator arm 34 of the engine 5 via the coupling wire 71 serving as the interlocking mechanism. Accordingly, it is possible to easily configure the interlocking mechanism such as the coupling wire 71 or the like for changing the rotating speed of the engine 5 on the basis of the operation of the forward moving pedal 31 and the backward moving pedal 32. It is possible to easily reduce a manufacturing cost of the structure in which the interlocking mechanism mentioned above and the like are arranged. Further, the operator can easily operate the forward moving pedal 31 and the backward moving pedal 32 in accordance with the same feeling as the accelerator pedal of the general motor vehicle. Since the rotating speed of the engine 5 is lowered only by releasing the foot of the operator from the forward moving pedal 31 and the backward moving pedal 32, it is possible to shorten a braking distance on the basis of an engine brake effect. In the case of moving at a low speed, the engine 5 can be activated at the low speed, and it is possible to reduce a noise and a fuel consumption.

As is apparent from the description mentioned above and FIG. 5, there are provided with the shift link 41 coupling the hydraulic continuously variable transmission 25, and the forward moving pedal 31 and the backward moving pedal 32, and the speed returning link 57 elastically pressed to the shift link 41 by the force of the speed returning spring 59, as the speed returning mechanism mentioned above, the foot of the operator is released from the forward moving pedal 31 and the backward moving pedal 32, and the forward moving pedal 31 and the backward moving pedal 32 are returned to the original positions. Accordingly, the shift link 41 is returned to the original position by the speed returning link 57, and the structure is made such as to maintain the output of the hydraulic continuously variable transmission 25 approximately zero. Therefore, the speed returning mechanism can be easily configured by the shift link 41 and the speed returning link 57, and it is possible to easily reduce the manufacturing cost of the structure in which the speed returning mechanism and the like are arranged.

As is apparent from the description mentioned above and FIG. 5, the accelerator arm 34 is arranged in the governor 33 serving as the speed adjusting mechanism capable of adjusting the rotating speed of the engine 5, and the hydraulic continuously variable transmission 25 is activated in the speed increasing side on the basis of the pedaling operation of the forward moving pedal 31 and the backward moving pedal 32, whereby the governor 33 is activated via the speed returning link 57 approximately in proportion to the pedaling amount of the forward moving pedal 31 and the backward moving pedal 32. Accordingly, it is possible to easily couple the governor 33 and the speed returning link 57, and the operator can easily operate the forward moving pedal 31 in the same feeling as the accelerator pedal of the general motor vehicle.

As is apparent from the description mentioned above and FIG. 5, the accelerator operating lever 35 capable of maintaining at the position operated by the operator is provided in the control column 15 serving as the driven control portion, and the operator operates the accelerator operating lever 35 so as to activate the accelerator arm 34 by the accelerator operating lever 35. Accordingly, the operator can select a working aspect for carrying out in a state of maintaining the engine 5 approximately at the fixed rotating speed on the basis of the operation of the accelerator operating lever 35, and a working aspect for carrying out in a state of changing the rotating speed of the engine 5 while working with the moving speed on the basis of the operation of the forward moving pedal 31 and the backward moving pedal 32, in correspondence with the kind of the work or the like. It is possible to change the rotating speed of the engine 5 while giving priority to the operation in the side that the rotating speed of the engine 5 becomes high, on the basis of any one of the operation of the accelerator operating lever 35 and the operation of the forward moving pedal 31 and the backward moving pedal 32. Further, it is possible to change the rotating speed of the engine 5 on the basis of the operation of the forward moving pedal 31 and the backward moving pedal 32 while maintaining the minimum rotating speed of the engine 5 on the basis of the operation of the accelerator operating lever 35. On the other hand, it is possible to carry out a work in which a working portion (for example, a hydraulic earth moving machine, a medicine sprayer, a power generator) driven at a higher rotating speed than the idling rotating speed of the engine 5 is installed to the traveling vehicle body 2.

As is apparent from the description mentioned above and FIG. 5, there are provided with the speed returning spring 59 and the speed returning link 57 for maintaining the output of the hydraulic continuously variable transmission 25 approximately zero, as the speed returning mechanism mentioned above. The speed returning link 57 serving as the speed returning mechanism is configured such as to be rotatable in the same direction on the basis of each of the operations in the forward moving side and the backward moving side of the forward moving pedal 31 and the backward moving pedal 32 serving as the shift pedal. In other words, the speed returning spring for maintaining the output of the hydraulic continuously variable transmission 25 approximately zero is coupled to the speed returning link 57, and the speed returning link 57 rotatable in the same direction on the basis of each of the operations in the forward moving side and the backward moving side of the forward moving pedal 31 and the backward moving pedal 32, and the governor 33 serving as the speed adjusting mechanism capable of adjusting the rotating speed of the engine 5 are coupled via the coupling wire 71 serving as the interlocking mechanism. Accordingly, for example, even in a see-saw pedal structure in which each of the operations in the forward moving side and the backward moving side can be carried out by one shift pedal obtained by integrally forming the forward moving pedal 31 and the backward moving pedal 32, it is possible to easily couple the forward moving pedal 31 and the backward moving pedal 32 to the accelerator arm 34 of the engine 5 via one wire 71 or link, and it is possible to easily reduce the manufacturing cost.

As is apparent from the description mentioned above and FIG. 5, the continuously variable transmission 25, and the forward moving pedal 31 and the backward moving pedal 32 are coupled via the shift link 41, the speed returning link 57 serving as the speed returning mechanism is coupled to the shift link 41, one end side of the coupling wire 71 serving as the interlocking mechanism is coupled to the speed returning link 57, and the other end side of the coupling wire 71 is coupled to the accelerator arm 34. Accordingly, the speed returning mechanism and the interlocking mechanism can be configured by the simple structure constituted by the link, the wire and the like, and it is possible to improve a workability for an assembly, a maintenance and the like.

As is apparent from the description mentioned above and FIGS. 3 and 4, the shift pedal is constituted by the forward moving pedal 31 and the backward moving pedal 32, the base end side of the forward moving pedal 31 and the intermediate of the pedal arm 32a of the backward moving pedal 32 are respectively coupled to both end portions of one pedal shaft 37, the pedaling portion 31a of the forward moving pedal 31 is protruded toward the front side of the machine body from the pedal shaft 37, and the pedaling portion 32b of the backward moving pedal 32 is protruded toward the rear side of the machine body opposite thereto. In other words, since the forward moving pedal 31 and the backward moving pedal 32 are arranged in the see-saw structure around the pedal shaft 37, it is possible to dispense with the feint mechanism or the like for inhibiting the operation of the other in the case of operating any one of the forward movement and the backward movement, and it is possible to easily form the structure of the forward moving pedal 31 and the backward moving pedal 32. Further, since the pedal shaft 37 is rotatably arranged in the floor plate 18 serving as the step of the traveling machine body 2, it is possible to easily assemble the forward moving pedal 31 and the backward moving pedal 32 by utilizing the step plate 18. For example, in comparison with the conventional structure in which the shift pedal is arranged in the traveling machine body 2 side, it is possible to shorten the length in the axial core direction of the pedal shaft 37, and it is possible to detachably install the forward moving pedal 31 and the backward moving pedal 32 without attaching and detaching the floor panel 18.

As is apparent from the description mentioned above and FIG. 3, the forward moving pedal 31 and the brake pedal 30 for braking the rear wheel 4 of the traveling machine body 2 are arranged so as to be adjacent right and left in the plan view. Accordingly, it is possible to easily improve an operability of the forward moving pedal 31 and the brake pedal 30 which are used very often in the forward moving work. Further, since the pedaling portion 31a of the forward moving pedal 31 is arranged in the front side in the forward moving direction in comparison with the pedal shaft 37, the pedaling portion 32b of the backward moving pedal 32 is arranged in the rear side in the forward moving direction in comparison with the pedal shaft 37, and the pedaling portion 31a of the forward moving pedal 31 and the pedaling portion 32b of the backward moving pedal 32 are arranged so as to be spaced in the diagonal direction in the plan view, it is possible to arrange the pedaling portion 31a of the forward moving pedal 31 and the pedaling portion 32b of the backward moving pedal 32 so as to be largely spaced in such a manner as to prevent an erroneous operation, by effectively utilizing the upper surface of the floor plate 18 having a limited area.

Next, a description will be given of a second embodiment in accordance with the present invention with reference to FIG. 7. The accelerator coupling arm 77 mentioned above is constituted by a base portion arm 80 arranged in the boss portion 57b, and a leading end arm 81 coupled to the base portion arm 80 via an adjusting screw 82. The base portion arm 80 and the leading end arm 81 are formed in such a manner as to freely adjust so as to expand and contract a total length of the accelerator coupling arm 77. In the case that the total length of the accelerator coupling arm 77 is made short, an amount of displacement of the accelerator arm 34 becomes small with respect to an amount of operation of the forward moving pedal 31 and the backward moving pedal 32, and a changing rate of the rotating speed of the engine 5 becomes smaller than a changing rate of the moving speed of the tractor 1. On the contrary, in the case that the total length of the accelerator coupling arm 77 is made long, the amount of displacement of the accelerator arm 34 becomes larger with respect to the amount of operation of the forward moving pedal 31 and the backward moving pedal 32, and the changing rate of the rotating speed of the engine 5 becomes larger than the changing rate of the moving speed of the tractor 1.

As is apparent from the description mentioned above and FIG. 7, there is provided the accelerator coupling arm 77 having the adjustable length as the speed returning mechanism. Since the accelerator coupling arm 77 and the accelerator arm 34 are coupled via the coupling wire 71 serving as the interlocking mechanism, it is possible to optionally set the range (the idling rotating speed or the maximum rotating speed) of the rotating speed of the engine 5 which is changed on the basis of the operation of the forward moving pedal 31 and the backward moving pedal 32, with respect to the operating strokes of the forward moving pedal 31 and the backward moving pedal 32. For example, in the case that the rotating speed of the engine 5 is not changed in the low speed operation of the forward moving pedal 31 and the backward moving pedal 32, and the forward moving pedal 31 and the backward moving pedal 32 are operated to the high speed side, it is possible to couple the accelerator arm 34 of the engine 5 to the forward moving pedal 31 and the backward moving pedal 32 in such a manner that the rotating speed of the engine 5 can be changed while working with the operation of the forward moving pedal 31 and the backward moving pedal 32. Accordingly, in the case of moving at a comparatively high speed, or in the case of the work having a comparatively high load, it is possible to easily secure a mobile power. In this case, it is possible to set such that the rotating speed of the engine 5 is not changed in all the operating region of the forward moving pedal 31 and the backward moving pedal 32.

Next, a description will be given of a third embodiment in accordance with the present invention with reference to FIG. 8. The accelerator coupling arm 77 mentioned above is constituted by a base portion arm 85 arranged in the boss portion 57a, and a leading end arm 86 rotatably coupled to the base portion arm 85 via a supporting shaft 87. An operation dial 88 is rotatably coupled to a screw 89 coupling the base portion arm 85 and the leading end arm 86. In the case that the operator rotatably operates the operation dial 88, and rotates the screw 89 coupling the base portion arm 85 and the leading end arm 86, the leading end arm 86 is rotated around the supporting shaft 87. Accordingly, the leading end arm 86 comes close to and away from an outer receiving body 75 opposing to the leading end arm 86.

For example, in the case that the leading end arm 86 comes close to the outer receiving body 75 opposing to the leading arm 86, a stopper 78 is released from the accelerator coupling arm 77, and the inner wire 72 comes to a state of being protruded from the outer wire 73, whereby the inner wire 72 is not pulled with respect to the low speed side operations of the forward moving pedal 31 and the backward moving pedal 32, and the accelerator arm 34 is not activated. The accelerator arm 34 is activated with respect to the high speed side operation of the forward moving pedal 31 and the backward moving pedal 32. Accordingly, when the tractor 1 is moved at a high speed, the rotating speed of the engine 5 is increased and decreased while working with the vehicle speed.

As is apparent from the description mentioned above and FIG. 8, the coupling wire 71 serving as the interlocking mechanism mentioned above is constituted by the inner wire 72 and the outer wire 73. Since the inner wire 72 is locked to the accelerator coupling arm 77 via the stopper 78, and the accelerator coupling arm 77 is configured such as to be capable of coming close to and away from the outer receiving body 75 for locking the outer wire 73, it is possible to optionally set the range (the idling rotating speed or the maximum rotating speed) of the rotating speed of the engine 5 which is changed on the basis of the operation of the forward moving pedal 31 and the backward moving pedal 32, with respect to the operating strokes of the forward moving pedal 31 and the backward moving pedal 32. For example, in the case that the rotating speed of the engine 5 is not changed in the low speed operation of the forward moving pedal 31 and the backward moving pedal 32, and the forward moving pedal 31 and the backward moving pedal 32 are operated to the high speed side, it is possible to couple the accelerator arm 34 of the engine 5 to the forward moving pedal 31 and the backward moving pedal 32 in such a manner that the rotating speed of the engine 5 can be changed while working with the operation of the forward moving pedal 31 and the backward moving pedal 32. Accordingly, in the case of moving at a comparatively high speed, or in the case of the work having a comparatively high load, it is possible to easily secure a mobile power. In this case, it is possible to set such that the rotating speed of the engine 5 is not changed in all the operating region of the forward moving pedal 31 and the backward moving pedal 32.

Next, a description will be given of a fourth embodiment in accordance with the present invention with reference to FIG. 9. The outer receiving body 75 opposed to the accelerator coupling arm 77 mentioned above is constituted by a base portion receiver 90 arranged in the clutch housing 10, and a leading end receiver 91 rotatably coupled to the base portion receiver 90 via a supporting shaft 92. An operation dial 94 is coupled to a screw 93 coupling the base portion receiver 90 and the leading end receiver 91. In the case that the operator rotatably operates the operation dial 94, and rotates the screw 93 coupling the base portion receiver 90 and the leading end receiver 91, the leading end receiver 91 is rotated around the supporting shaft 92. Accordingly, the leading end receiver 91 comes close to and away from the accelerator coupling arm 77 opposing to the leading end receiver 91.

In other words, in the case that the leading end receiver 91 comes close to the accelerator coupling arm 77 opposing to the leading receiver 91, the inner wire 72 comes to the protruded state, the inner wire 72 is not pulled with respect to the low speed side operations of the forward moving pedal 31 and the backward moving pedal 32, and the accelerator arm 34 is not activated. The accelerator arm 34 is activated with respect to the high speed side operation of the forward moving pedal 31 and the backward moving pedal 32. Accordingly, when the tractor 1 is moved at a high speed, the rotating speed of the engine 5 is increased and decreased while working with the vehicle speed.

As is apparent from the description mentioned above and FIG. 9, the coupling wire 71 serving as the interlocking mechanism is constituted by the inner wire 72 and the outer wire 73. Since the inner wire 72 is locked to the accelerator coupling arm 77 via the stopper 78, and the outer receiver 75 for locking the outer wire 73 is configured such as to be capable of coming close to and away from the accelerator coupling arm 77, it is possible to optionally set the range (the idling rotating speed or the maximum rotating speed) of the rotating speed of the engine 5 which is changed on the basis of the operation of the forward moving pedal 31 and the backward moving pedal 32, with respect to the operating strokes of the forward moving pedal 31 and the backward moving pedal 32. For example, in the case that the rotating speed of the engine 5 is not changed in the low speed operation of the forward moving pedal 31 and the backward moving pedal 32, and the forward moving pedal 31 and the backward moving pedal 32 are operated to the high speed side, it is possible to couple the accelerator arm 34 of the engine 5 to the forward moving pedal 31 and the backward moving pedal 32 in such a manner that the rotating speed of the engine 5 can be changed while working with the operation of the forward moving pedal 31 and the backward moving pedal 32. Accordingly, in the case of moving at a comparatively high speed, or in the case of the work having a comparatively high load, it is possible to easily secure a mobile power. In this case, it is possible to set such that the rotating speed of the engine 5 is not changed in all the operating region of the forward moving pedal 31 and the backward moving pedal 32.

As is apparent from the description mentioned above and FIGS. 8 and 9, since there are provided with the screws 89 and 93 serving as the setting mechanism for changing the interlocking range in which the speed returning link 57 and the accelerator arm 34 are coupled via the interlocking wire 71, and the operation dial 88 serving as the operating means for changing the interlocking range set by the screws 89 and 93, it is possible to optionally set the range (the idling rotating speed or the maximum rotating speed) of the rotating speed of the engine 5 which is changed on the basis of the operation of the forward moving pedal 31 and the backward moving pedal 32, with respect to the operating stroke of the forward moving pedal 31 and the backward moving pedal 32, for example, only by the operation of the operation dial 88 by the operator in the control seat 17, and it is possible to easily adapt the interlocking range to the working condition or the like.

As is apparent from the description mentioned above and FIGS. 8 and 9, the screws 89 and 93 are configured such as to reduce the interlocking range to the high speed output side on the basis of the output at a time when the forward moving pedal 31 and the backward moving pedal 32 are at the original positions, and are configured such that the accelerator arm 34 is activated via the speed returning link 57 on the basis of the pedaling operation in the high speed output side of the forward moving pedal 31 and the backward moving pedal 32. Accordingly, it is possible to execute the work having the high load by setting the minimum rotating speed of the engine 5 to the high speed side and maintaining the moving speed at the low speed, and it is possible to easily prevent a trouble (a stop due to an overload or the like) of the engine 5 in the work having the high load.

The invention claimed is:

1. A working vehicle, comprising:
   an engine mounted to a traveling machine body provided with traveling wheels;
   a hydraulic variable speed gear shifting a power from said engine;
   a shift pedal operating so as to increase and decrease a shift output of said hydraulic variable speed gear;
   a speed returning mechanism maintaining an output of said hydraulic variable speed gear approximately zero; and
   an accelerator arm operating a speed adjusting mechanism capable of adjusting a rotating speed of said engine,
   wherein a drive control portion is provided with an accelerator operating lever capable of being maintained at a position operated by an operator, and said accelerator operating lever is coupled to said accelerator arm via an accelerator wire which can be activated only in a pulling direction,
   wherein said speed returning mechanism has a shift link coupling said hydraulic variable speed gear and said shift pedal, and a speed returning link brought in to contact with said shift link in a direction of returning said shift pedal to an original position by an energizing force of a speed returning spring, and an accelerator coupling arm that is coupled to said speed returning link,
   wherein said speed returning link is configured such as to be movable in the same direction on the basis of each of operations in a forward moving side and a backward moving side of said shift pedal, and said accelerator coupling arm is coupled to said accelerator arm of said speed adjusting mechanism via a coupling wire that can be activated only in a pulling direction, wherein said speed returning link returns said shift link to an original position on the basis of an operation of releasing a foot from said shift pedal so as to maintain an output of said hydraulic variable speed gear approximately zero, and wherein said shift link operates said hydraulic variable speed gear to a speed increasing side on the basis of a pedaling operation of said shift pedal, and said accelerator arm operates said speed adjusting mechanism to a high rotation side, greater than or equal to a setting of said accelerator operating lever, via said speed returning link, said accelerator coupling arm and said coupling wire, approximately in proportion to an amount of a pedaling operation of said shift pedal.

2. The working vehicle according to claim 1, further comprising a setting mechanism for changing an interlocking range in which said speed returning mechanism and said accelerator arm are coupled via said interlocking mechanism, and an operating means for changing said interlocking range set by said setting mechanism.

3. The working vehicle according to claim 2, wherein said setting mechanism is configured such as to be capable of reducing said interlocking range to a high speed output side on the basis of an output at a time when said shift pedal is at the original position, and said accelerator arm is operated via said speed returning mechanism on the basis of a pedaling operation in a high speed output side of said shift pedal.

4. The working vehicle according to claim 2, wherein a forward moving pedal and a brake pedal for braking a rear wheel of said traveling machine body are arranged so as to be adjacent right and left in a plan view, and a pedaling portion of said forward moving pedal is arranged in a front side in a forward moving direction in comparison with said pedal shaft, a pedaling portion of a backward moving pedal is arranged in a rear side in the forward moving direction in comparison with said pedal shaft, and the pedaling portion of said forward moving pedal and the pedaling portion of said backward moving pedal are arranged so as to be spaced in a diagonal direction in a plan view.

5. A working vehicle, comprising:
an engine mounted to a traveling machine body provided with traveling wheels;
a variable transmission for transmitting a power from said engine to driven ones of said traveling wheels;
at least one shift pedal operable to selectively increase and decrease a shift output of said variable transmission;
a speed adjusting mechanism including an accelerator arm for operating said speed adjusting mechanism, said speed adjusting mechanism being configured to be operable for adjusting a rotating speed of said engine;
a drive control portion including an accelerator operating lever configured to be maintainable at a position operated by an operator of said working vehicle, said accelerator operating lever being coupled to said accelerator arm via an accelerator wire which can be activated only in a pulling direction;
a speed returning mechanism for returning said variable transmission to a neutral position at which an output thereof is approximately zero, said speed returning mechanism including a shift link coupling said variable transmission and said at least one shift pedal which is biased in a direction of returning said at least one shift pedal to an original position; and
an accelerator coupling arm being coupled to said accelerator arm of said speed adjusting mechanism via a coupling wire that can be activated only in a pulling direction, said speed returning mechanism being configured to return said shift link to an original position on the basis of an operation of releasing a foot of the operator from said at least one shift pedal so as to maintain an output of said variable transmission at approximately zero, said shift link operating said variable transmission to a speed increasing side thereof based on a pedaling operation of said at least one shift pedal, and said accelerator arm operating said speed adjusting mechanism to a high rotation side, greater than or equal to the setting of said accelerator operating lever, via said accelerator coupling arm and said coupling wire, approximately in proportion to an amount of a pedaling operation of said at least one shift pedal.

6. The working vehicle according to claim 5, wherein said variable transmission is a hydraulic continuously variable type transmission.

7. The working vehicle according to claim 5, wherein said at least one shift pedal includes a forward moving pedal and a backward moving pedal.

8. The working vehicle according to claim 5, wherein one end side of said coupling wire is coupled to the accelerator coupling arm via a wire stopper so as to be activated only in the pulling direction.

* * * * *